United States Patent [19]

Rand

[11] 4,333,982
[45] Jun. 8, 1982

[54] FUSIBLE INTERLINING OF A TEXTILE SHEET AND A HEAT-SEALABLE FILM FOR WASHABLE GARMENTS

[75] Inventor: Edward R. Rand, Paris, France

[73] Assignee: Lainière de Picardie, Péronne, France

[21] Appl. No.: 173,602

[22] Filed: Jul. 30, 1980

[30] Foreign Application Priority Data

Jul. 31, 1979 [CH] Switzerland ................ 7056/79

[51] Int. Cl.³ .............................................. D03D 3/00
[52] U.S. Cl. ........................................ 428/245; 2/143;
2/232; 428/253; 428/260; 428/264; 428/265;
428/267; 428/284; 428/287; 428/290; 624/505
[58] Field of Search ............... 525/98; 260/33.6 R,
260/33.6 AQ; 428/245, 253, 254, 262, 264, 265,
284, 287, 289, 267; 2/143, 232

[56] References Cited

U.S. PATENT DOCUMENTS 4,110,500 8/1978 Evans et al. ...................... 428/35

FOREIGN PATENT DOCUMENTS 1296109 11/1972 United Kingdom .

OTHER PUBLICATIONS

Shell Technical Bulletins, RBX/72/24; RBX/73/5; RBX/76/3; and RBX/76/4.
"A Report on Fusing in the Apparel Industry", John M. Murray, (1970), pp. 5–55.
"Nature Vol. 225", Keller, (1970), pp. 538 & 539.
"Adhesive Age", Edmonds, Dec. 1971, pp. 15–20.
"International Rubber Conference", Prague, Sep. 17–20, 1973.

Primary Examiner—James J. Bell
Attorney, Agent, or Firm—Finnegan, Henderson, Farabow, Garrett & Dunner

[57] ABSTRACT

A fusible inter-lining for washable garments comprising at least one textile sheet-like structure which does not soften or melt at temperatures below 200° C. and a heat-sealable film consisting essentially of 50 to 75% by weight of a thermoplastic elastomer and 25 to 50% by weight of at least one modifier selected from the group consisting of homopolymers and copolymers of lower olefins; thermoplastic polymers of aromatic vinyl compounds selected from homopolymers of styrene, α-methylstyrene or vinyltoluene and copolymers of the said monomers with one another; and plasticizing hydrocarbon oils.

10 Claims, No Drawings

FUSIBLE INTERLINING OF A TEXTILE SHEET AND A HEAT-SEALABLE FILM FOR WASHABLE GARMENTS

The first fusible interlinings, which at the time were still referred to as heat-sealable interlinings, were prepared in the 1950's [Melliand Textilberichte 53, 229 (1972); "A Report on Fusing in the Apparel Industry", published by the Apparel Research Foundation Inc., Washington, D.C., USA (1970)]. As a rule, fusible interlinings consist of a substrate (base material) and a thermoplastic which is non-tacky at room temperature but at higher temperatures becomes tacky and in most cases also more or less fluid. Usually, hot-melt adhesives are used for this purpose. Suitable substrates are above all woven fabrics and nonwovens, but also knitted fabrics. However, plastic films without a textile base material have also already been fused directly to the outer fabric (A Report on Fusing in the Apparel Industry, page 6). Furthermore, fusible nonwovens without a base fabric have also been used directly as fusible interlinings [Melliand Textilberichte 60, 127 (1979)].

Various processes for the production of fusible interlinings were described by K. H. Stukenbrock in "Bekleidung und Wäsche", No. 3 Feb. 8th, 1968), pages 142 to 153. Thus, a thermoplastic film can be placed on the fabric, travelling with the film, as the film is being produced, or a prefabricated film can be pressed on to the fabric. These processes however hitherto had the disadvantage that a relatively stiff interlining results which in most cases, particularly when washed at the boil, shows different shrinkage characteristics from those of the outer fabric. Such interlinings have in particular been used for shirt collars and the like.

According to Karlheinz Schicktanz [Melliand Textilberichte 59, 964 to 966 (1978)] the following processes for applying thermoplastic hot-melt adhesives have proved successful in industrial operation:
1. Powder-sprinkle coating
2. Powder dot gravure-print coating
3. Powder dot rotary print coating
4. Paste dot rotary print coating.

Further information on the production of fusible interlinings is to be found in an article by H. P. Seidel and K. H. Stukenbrock under the title "Heisssiegelungen-Anwendungstechnik und Analytik, Teil 1: Anwendungstechnik" ("Heat-sealing—Technology and Analysis, Part 1: Technology") in Zeitschrift für die gesamte Textilindustrie 70, pages 561 to 564.

K. Stukenbrock reports on "Chemische Grundlagen von Heiss-Siegelklebern für Fixiereinlagen" ("Chemical Bases of Hot-melt Adhesives for Fusible Interlinings") in Textilveredlung 6, 459 to 468 (1971). This article states that amongst the numerous thermoplastics which are available, virtually only the following have found acceptance for fusible interlinings:
(1) High pressure polyethylene and low pressure polyethylene
(2) Polyvinyl acetate
(3) Ethylene/vinyl acetate copolymers
(4) Partially or completely saponified copolymers of this type
(5) Polyamides
(6) Plasticised vinyl chloride/vinyl acetate copolymers
(7) Plasticised cellulose acetate
(8) Mixtures of a novolac and polyvinyl acetate.

The fusible interlinings known hitherto have various disadvantages when used in the production of washable garments, e.g. men's shirts, children's shirts, blouses, nightwear, brassieres and the like, especially in shirt collars, blouse collars, cuffs, pocket flaps, epaulettes and the like. The use of heat-sealable polyethylene films in the washable garments industry, especially in shirts, has proved unsatisfactory because the laminates of textile sheet-like structures and polyethylene films proved too brittle and stiff ("cement collars"). Hence, at the present time, high density polyethylene applied in dots, by a printing process, to a textile base material is the product most extensively used for interlinings which can be fixed directly by heat-sealing to the outer fabric (top-fusible interlinings), for example for collars, cuffs or pocket flaps. This achieves better flexibility and better drape than in the case of film coating or powder-sprinkle coating.

However, powder dot coating also has shortcomings and disadvantages, namely
(1) occasional missing dots, or dots falling off after coating, which on washing can cause the interlining to detach from the outer fabric;
(2) formation of opaque dots due to the crystallinity of the high density polyethylene, which, in spite of the use of smaller and—to compensate—more numerous dots leads to the dots becoming visible through the outer fabric, particularly if the latter is thin and transparent, the effect becoming progressively more pronounced after repeated washing;
(3) tendency of the thermoplastic coating to shrink during the heat-seal operation unless extreme care is taken in producing the fusible interlining, which shrinkage causes difficulties in cutting out the fabric and in the manufacture of shirts.

It is an object of the invention to provide a novel heat-sealable film which can be used as a fusible interlining, which does not suffer from any of the disadvantages of the known fusible interlinings and which is outstandingly suitable for use in the washable garment industry, especially in making up of men's shirts.

It has now been found that heat-sealable films comprising
(a) 50 to 75% by weight of a thermoplastic elastomer and
(b) 25 to 50% by weight of at least one modifier selected from
   ($\alpha$) homopolymers and copolymers of lower olefines,
   ($\beta$) thermoplastic polymers of aromatic vinyl compounds selected from homopolymers of styrene, $\alpha$-methylstyrene and vinyltoluene and copolymers of the said monomers with one another, and
   ($\gamma$) plasticising hydrocarbon oils, either by themselves or in combination with at least one textile sheet-like structure which does not soften or melt at temperatures below 200° C., can be used as a fusible interlining, especially for washable garments. These films are soft and flexible but nevertheless have stable dimensions and a stable shape. They not only act as hot-melt adhesives but also provide durable stabilisation of shape; consequently the appearance, flexibility and shape of the washable garments produced with these films do not alter even after repeated washing without ironing.

The films according to the invention can be used without a base material, in place of conventional fusible interlinings, between two layers of outer fabric, thereby simplifying and cheapening their use. An example of this embodiment is the production of cuffs. However, the films can also be extruded directly onto a single textile sheet-like base and the product can then be used, for example in the production of collars, instead of the conventional interlinings in which a second reinforcing interlining is bonded to the back of a fusible interlining which can be bonded directly to the outer fabric, the reinforcing interlining being intended to give the collar additional stability. It is particularly advantageous to use the film only in the outer face of two-part collars, the outer face not coming into contact with the skin. Two-part collars produced in this way are cheap and pleasant to wear and could replace the one-part collars which are currently widely used in Europe.

Woven fabrics, knitted fabrics or nonwovens can be used as textile sheet-like structures which do not soften or melt at temperatures below 200° C. The textile sheet-like structures can consist, for example, of cotton, regenerated cellulose, acrylic fibres, polyamide fibres and/or polyester fibres.

It is however particularly advantageous to use, as the textile sheet-like structure, a nonwoven of which the fibres run preferably for at least the greater part in one direction. Hitherto, the use of nonwovens in fusible interlinings has not proved very successful because the fibres of the nonwovens become loose, and shift, on repeated washing. If, on the other hand, a film according to the invention is combined with a nonwoven, the fibres of the nonwoven are fixed without the fusible interlining becoming stiff. The resistance to repeated washing of a fusible interlining produced in this manner is therefore as good as that of a fusible interlining produced using a woven fabric. This permits a very considerable cost reduction.

A further advantage of the film according to the invention is based on the fact that it can readily be mass-coloured so that there is no difference in colour from the outer fabric.

Finally, the films according to the invention can also be used as stiffener strips for shirt collars, these strips being nowadays mainly made from polyester sheet. Strips made from polyester sheet are difficult to introduce into the shirt collar, break or deform on washing, and press through on the surface of the collar, making the latter unattractive. The films used according to the invention, on the other hand, whilst being less thick and hence pressing through less, provide better stability, are heat-sealable and therefore can easily and without problems be permanently positioned in the collar, and do not ruckle or become deformed on washing, because they contain a genuine rubber.

In the molten state, the films according to the invention exhibit better flow than the polyethylenes used at the present time in the washable garment industry, so that strike-through of the thermoplastics on to the outer fabric is prevented and furthermore the heat-seal conditions (duration, temperature and pressure) are subject to fewer restrictions. It is possible to mix a high density polyethylene, at least one thermoplastic polymer of one or more aromatic vinyl compounds selected from styrene, α-methylstyrene and vinyltoluene, and a plasticising hydrocarbon oil with the thermoplastic elastomer in such a way that the melting point of the film is lower than that of the polyethylene; consequently, heat-sealing can be effected under milder conditions. This however also makes it possible to use more sensitive textiles and makes the process of more diverse applicability than hitherto.

Suitable thermoplastic elastomers include linear three-block copolymers of the ABA type [compare, for example, Ullmanns Encyklopädie der technischen Chemie, 4th edition, volume 15, pages 204 and 224/225, Verlag Chemie, Weinheim and New York 1978 and A. Keller et al., Nature 225, 538 (1970)], whose outer segments A consist of polystyrene, whilst the middle segment B consists of polyisoprene or, preferably, polybutadiene, and the total polystyrene content is less than 40% by weight. In these block copolymers the thermoplastic polystyrene phase consists of so-called domains which are embedded in the continuous, elastomeric polyisoprene phase or polybutadiene phase. The domains are so small (about 300 A) that there is no scattering of visible light and the block copolymer is therefore transparent.

Block copolymers having a radial structure, of the $(AB)_nX$ type [compare, for example, O. L. Marrs and L. O. Edmonds, Adhesive Age 15 (December 1971)] also have similar properties. These thermoplastic, elastomeric block copolymers are in general produced by coupling two-block copolymers of the AB type to polyfunctional compounds.

The main difference between the "linear" and the "radial" thermoplastic elastomers is that the "radial" thermoplastic elastomers have a lower viscosity, both in the molten state and in solution, for the same molecular weight.

It is known that the properties of thermoplastic elastomers can be modified by the addition of hydrocarbon oils which plasticise the elastomeric phase. Advantageously, these plasticisers are incompatible with the thermoplastic phase so as to prevent a worsening of the mechanical properties. Hence, it is above all saturated aliphatic (that is to say paraffinic) or saturated cycloaliphatic (that is to say naphthenic) hydrocarbon oils which are employed (compare, for example, P. Comi, D. Girelli and E. Mignanelli, "Thermoplastic Rubbers; Properties, Compounding and Applications", International Rubber Conference, Prague, 17th to 20th September 1973).

It is also known that for certain applications thermoplastic elastomers can be mixed with polymeric fillers, namely polyethylene, polypropylene or ethylene/vinyl acetate copolymers (compare, for example, the above-mentioned publication by P. Comi et al.).

The use of thermoplastic elastomers for modifying polyolefines, especially polyethylene of high or low density or polypropylene, has already been proposed, especially for the purpose of improving the impact strength. Mixtures of thermoplastic elastomers with high density polyethylene are recommended for blow-moulding processes, extrusion of films and injection moulding processes, especially for the manufacture of steam-sterilisable pouches for foodstuffs, and the manufacture of bottles. Mixtures of thermoplastic elastomers with low density polyethylene give tough films which are suitable for use as a substitute for plasticised PVC films. Mixtures of thermoplastic elastomers with polypropylene are suitable for the manufacture of film tapes. However, it has hitherto been assumed that it was necessary to have more than 50% by weight of polyolefine of very low melt index (for example 4) present for the mixture to show suitable rheological properties in the extruder screw, and for the film to be stretchable (compare, for example, Technical Bulletins RBX/72/24, RBX/73/5, RBX/76/3 and RBX/76/4 of Shell Chemicals).

Finally, U.S. Pat. No. 4,110,500 (published on 29th August 1978) discloses a film which contains 80 to 45% by weight of a thermoplastic elastomer and, correspondingly, 20 to 55% by weight of at least one thermoplastic resin which contains aromatic groups and which can be a polymer or copolymer of styrene, α-methylstyrene and/or vinyltoluene. Advantageously, the film also contains anti-blocking agents, slip agents, fillers, pigments and stabilisers. The film is normally produced by casting from solution but is allegedly also capable of being produced from the melt by extrusion and calendering. The film is used for packaging of unvulcanised rubber and of constituents intended to be mixed into thermoplastic polymers, because, in contrast to polyethylene films, the film in question—which becomes incorporated into the end product—has no adverse effect on the properties of the latter.

The possibility of using thermoplastic elastomers or their mixtures with olefine homopolymers or olefine copolymers, thermoplastic polymers of aromatic vinyl compounds and/or plasticising hydrocarbon oils as heat-sealable materials, in particular as fusible interlinings, was not mentioned, or even touched on, either in the literature on thermoplastic elastomers or in the literature on hot-melt adhesives or fusible interlinings.

Examples of olefine homopolymers for the purposes of the invention are high density polyethylene (also referred to as low pressure polyethylene, rigid polyethylene or linear polyethylene), low density polyethylene (also referred to as high pressure polyethylene, soft polyethylene or branched polyethylene), polypropylene, polybutenes and ethylene/propylene rubbers. Examples of olefine copolymers are copolymers of ethylene and vinyl acetate, for example the products sold under the trade mark "Alkathene" by ICI. The olefine polymers preferably have a melt index of about 20. High density polyethylene, which preferably has a melt index of 20, is especially preferred. The use of ethylene/vinyl acetate copolymers improves the elastomeric properties and flexibility of the films. Such films can be bonded even to extremely light, fine fabrics which are normally only hand-washed.

Suitable thermoplastic polymers of aromatic vinyl compounds are in particular those having a softening point of about 100° to 120° C. Copolymers, especially those which are predominantly built up from α-methylstyrene, such as the products sold under the trade marks Kristalex F 100 (softening point about 100° C.) and F 120 (softening point about 120° C.) by Hercules, lower the melt viscosity (melt index) and improve the flow of the thermoplastic elastomer, as a result of which the extrusion of the film is facilitated and its sealability and adhesion are improved. Homopolymers, especially polystyrenes, such as the products sold under the trade mark Piccolastic D (for example Piccolastic D 100, having a softening point of about 100° C.) by Hercules, improve the flexibility of the film.

Particularly suitable plasticising hydrocarbon oils are saturated aliphatic or cycloaliphatic hydrocarbon oils, such as the products sold under the trade mark Ondina 32, from Shell, but, for example, mixtures of synthetic polyalkylbenzenes, such as the products sold under the trade mark Progiline by Rhone-Poulenc, can also be used. As has been mentioned, these oils plasticise the elastomeric phase of the thermoplastic elastomer, so that the film is even softer and even more easily fusible.

By using the modifiers defined above it is possible to produce films by means of which any substrates, for example woven fabrics and nonwovens of cotton or of any desired synthetic fibres, can be bonded under mild conditions (130° to 150° C., 12 to 16 seconds, 500 g/cm$^2$) with any desired outer fabrics, including very sensitive or transparent outer fabrics. The laminates thereby obtained have a natural handle and are soft and flexible, but nevertheless have a stable size and shape and are completely washable, that is to say they do not shrink either under the influence of heat or under the influence of moisture and lie flat, in their original shape, after washing without ironing. Furthermore, the films do not modify either the appearance or the colour of the outer fabric and can be used on existing ironing presses. Their low price is particularly advantageous, especially if the films are used together with nonwovens, which are also cheap.

These properties were not achievable with films of thermoplastic elastomers or of their known mixtures with olefine homopolymers or olefine copolymers or with thermoplastic resins containing aromatic groups or with plasticising hydrocarbon oils. Thus, for example, a known film of a mixture of 50% by weight of a thermoplastic elastomer and 50% by weight of low density polyethylene (the product sold under the trade mark Kraton by Shell Chemicals) admittedly has such a low softening point that it softens under normal fusing conditions for interlinings (160° C., 16 seconds, 1.5 kg/cm$^2$), but does not flow sufficiently, in its softened state, into the substrates or outer fabrics to produce durable adhesion. For the purposes of the invention, the laminates obtained are too stiff and rustle too much, this being probably related to the crystallinity of the olefine polymer.

Quite specific properties are critical for the use of the material as a fusible interlining, namely the rheological behaviour in the extruder screw, the mutual compatibility of the components, the melt index (the melt viscosity) and suitable flow characteristics on softening or melting. In the case of the films according to claims 5 and 6 it has proved possible to suppress completely the rubbery properties of the thermoplastic elastomer in the molten state (that is to say in the extruder screw), so that suitable films can be extruded, and the films can then be stretched, after which they can be converted to a completely rubbery state, for example on cooling rollers.

In order that the mixture of the components should show suitable rheological behaviour for the manufacture of films, the mixture must be homogeneous. For this reason it is preferred to premix it before extrusion, for example in a Co-Kneader from Messrs. Buss AG in Prattein (Switzerland). The extrusion and stretching can be carried out in the manner known to those skilled in the art, as can the bonding to a substrate and/or an outer fabric. A detailed explanation of these measures is not necessary.

Advantageously, the customary anti-blocking agents, for example fatty acid amides, for instance stearylamide, or silicones, soaps, waxes, pigments, vegetable lecithins and the like as well as antioxidants which may simultaneously act as light stabilisers and/or heat stabilisers, ageing stabilisers or synergistic agents, are added to the mixture. Examples of suitable antioxidants are phenol derivatives and sulphur compounds which are synergistic agents for phenolic antioxidants, for example 2,6-di-tert.-butyl-4-methylphenol, which also acts as a light stabiliser and ageing stabiliser and does not discolour, pentaerythrityl tetrakis-[3-(3,5-di-tert.-butyl-4-hydroxyphenyl)-propionate], which also acts as a heat stabiliser and is of low volatility, and 3,3'-thio-bis-(propionic acid dodecyl ester), which is also referred to as dilauryl thiodipropionate.

In the examples which follow, the thermoplastic elastomer used was the product sold under the trade mark Cariflex 1102, from Shell Chemicals, the olefine polymers used were the products sold under the trade mark Eltex 3180 (high density polyethylene, melt index 20) by Solvay, and Carlona 18,020 (low density polyethylene, melt index 20), from Shell Chemicals, the thermoplastic polymers of aromatic vinyl compounds which were used were the products, mentioned above, sold under the trade marks Kristalex and Piccolastic by Hercules, the plasticising hydrocarbon oil used was the product, mentioned earlier, sold under the trade mark Ondina 32, the anti-blocking agent used was the product sold under the trade mark Unem 4400 (stearylamide), from Unilever, and the antioxidants being used were the products sold under the trade marks Ionol (2,6-di-tert.-butyl-4-methylphenol) from Shell, Irganox 1010 (pentaerythrityl tetrakis-[3-(3,5-di-tert.-butyl-4-hydroxyphenyl)-propionate], from Ciba-Geigy) and DLTDP (the dilauryl thiodipropionate mentioned above).

EXAMPLE 1

| Constituents of the film | Parts by weight | | |
|---|---|---|---|
| Cariflex 1102 | 70 | 80 | 60 |
| Eltex 3180 | — | 20 | 40 |
| Carlona 18020 | 30 | — | — |
| Kristalex F 100 | 10 | 14 | 12 |
| Unem 4400 | 0.5 | 0.5 | 0.5 |
| Ionol | 0.3 | 0.3 | 0.3 |
| Irganox 1010 | 0.3 | 0.3 | 0.3 |
| DLTDP | 0.3 | 0.3 | 0.3 |

These constituents were premixed in a Buss Co-Kneader and the mixture was then extruded in the usual manner, and stretched, to give films having a weight per unit area of 30 to 100 g/m², which were suitable for use as fusible interlinings.

EXAMPLE 2

Films having a weight per unit area of 35 to 100 g/m² were produced in the same manner from the following mixtures:

| Constituents of the film | Parts by weight | | | |
|---|---|---|---|---|
| Cariflex 1102 | 80 | 80 | 80 | 80 |
| Eltex 3180 | 15 | 10 | 10 | 20 |
| Kristalex F 100 | 10 | 10 | 10 | 10 |
| Piccolastic D 100 | 5 | 10 | 5 | 5 |
| Ondina 32 | 5 | 8 | 8 | 8 |
| Unem 4400 | 0.5 | 0.5 | 0.5 | 0.5 |
| Ionol | 0.3 | 0.3 | 0.3 | 0.3 |
| Irganox 1010 | 0.3 | 0.3 | 0.3 | 0.3 |
| DLTDP | 0.3 | 0.3 | 0.3 | 0.3 |

These films were even more flexible and softer than the films of Example 1 and could be fused even more easily.

Though it suffices as a rule if the films have a weight per unit area of 30 to 100 g/m², preferably 40 to 100 g/m², a weight per unit area of up to 200 g/m², for example of 120 to 150 g/m², is advantageous for certain purposes.

I claim:

1. A fusible interlining for washable garments comprising at least one textile sheet-like structure which does not soften or melt at temperatures below 200° C. and a heat-sealable film consisting essentially of 50 to 75% by weight of a thermoplastic elastomer and 25 to 50% by weight of at least one modifier selected from the group consisting of homopolymers and copolymers of lower olefins; thermoplastic polymers of aromatic vinyl compounds selected from homopolymers of styrene, α-methylstyrene or vinyltoluene and copolymers of the said monomers with one another; and plasticizing hydrocarbon oils.

2. The fusible interlining of claim 1, in which the film contains 60 to 70% by weight of the thermoplastic elastomer, 5 to 20% by weight of an olefin homopolymer or copolymer, 5 to 15% by weight of a thermoplastic α-methylstyrene copolymer, 4 to 10% by weight of polystyrene, 4 to 7% by weight of a saturated aliphatic or cycloaliphatic hydrocarbon oil, about 0.5% by weight of an anti-blocking agent and about 1% by weight of an antioxidant.

3. The fusible interlining of claim 1, in which the thermoplastic elastomer is a linear three-block copolymer of the ABA type, A consisting of polystyrene and B consisting of polyisoprene or polybutadiene, the total polystyrene content of the elastomer being less than 40% by weight.

4. The fusible interlining of claim 3, in which the film contains 65 to 70% by weight of the thermoplastic elastomer, 9 to 16% by weight of high density polyethylene, 8 to 9% by weight of a thermoplastic α-methylstyrene copolymer, about 4% by weight of polystyrene, 6 to 7% by weight of a saturated cycloaliphatic hydrocarbon oil, about 0.5% by weight of stearylamide, about 0.3% by weight of 2,6-di-tert.-butyl-4-methylphenol, about 0.3% by weight of pentaerythrityl tetrakis-[3-(3,5-di-tert.-butyl-4-hydroxyphenyl)propionate] and about 0.3% by weight of 3,3'-thio-bis-(propionic acid dodecyl ester).

5. The fusible interlining of claim 1, in which the olefin is polyethylene, polypropylene, polybutene or an ethylene/vinyl acetate copolymer.

6. The fusible interlining of claim 5 in which the olefin is high density polyethylene.

7. The fusible interlining of claim 1, which the film has a weight per unit area of up to 200 g/m².

8. The fusible interlining of claim 1, in which the textile sheet-like structure is a woven, knitted or nonwoven fabric.

9. The fusible interlining of claim 8, in which the textile consists of cotton, regenerated cellulose, acrylic fibers, polyamide fibers or polyester fibers.

10. The fusible interlining of claim 9, in which the textile is a nonwoven fabric in which the fibers lie essentially in one direction.

* * * * *